(12) United States Patent
Noda et al.

(10) Patent No.: US 6,366,412 B1
(45) Date of Patent: Apr. 2, 2002

(54) LENS SYSTEM FOR READING IMAGES AND IMAGE READER

(75) Inventors: Takayuki Noda, Urawa; Yoko Nakai, Yono, both of (JP)

(73) Assignee: Fuji Photo Optical Co., Ltd., Omiya (JP)

( * ) Notice: Subject to any disclaimer, the term of this patent is extended or adjusted under 35 U.S.C. 154(b) by 0 days.

(21) Appl. No.: 09/661,261

(22) Filed: Sep. 13, 2000

(30) Foreign Application Priority Data

Sep. 27, 1999 (JP) .......................................... 11-271593

(51) Int. Cl.$^7$ ................................................. G02B 9/62
(52) U.S. Cl. ........................ 359/760; 359/759; 359/757; 359/756
(58) Field of Search ................................ 359/760, 759, 359/757, 756

(56) References Cited

U.S. PATENT DOCUMENTS 5,293,270 A * 3/1994 Hirano et al. ............... 359/760
5,388,003 A * 2/1995 Naganuma .................. 359/649
5,920,434 A * 7/1999 Mori .......................... 359/663

FOREIGN PATENT DOCUMENTS

| JP | H9-304696 | 11/1997 |
| JP | 2729039 | 12/1997 |
| JP | 2790919 | 6/1998 |
| JP | H11-109221 | 4/1999 |

* cited by examiner

Primary Examiner—Jorgan Schwartz
Assistant Examiner—Timothy Thompson
(74) Attorney, Agent, or Firm—Arnold International; Bruce Y. Arnold

(57) ABSTRACT

A lens system for reading images, consisting of six lens elements of positive, positive, negative, negative, positive and positive refractive power, respectively, in order from the object side, with a stop positioned between the third lens element and the fourth lens element. The first lens element $L_1$ and the second lens element $L_2$ each has a convex surface on the object side. The third lens element $L_3$ has a concave surface on the image side, and the fourth lens element $L_4$ has a concave surface on the object side. A fifth lens element $L_5$ and a sixth lens element $L_6$ each has a convex surface on the image side. At least one of the two pairs of lens elements $L_2$, $L_3$, and $L_4$, $L_5$ are coupled together, and specified conditions are satisfied in order to provide a lens having high resolution for color images.

19 Claims, 11 Drawing Sheets

DISTORTION

ASTIGMATISM

SPHERICAL ABERRATION

FIG. 3C DISTORTION
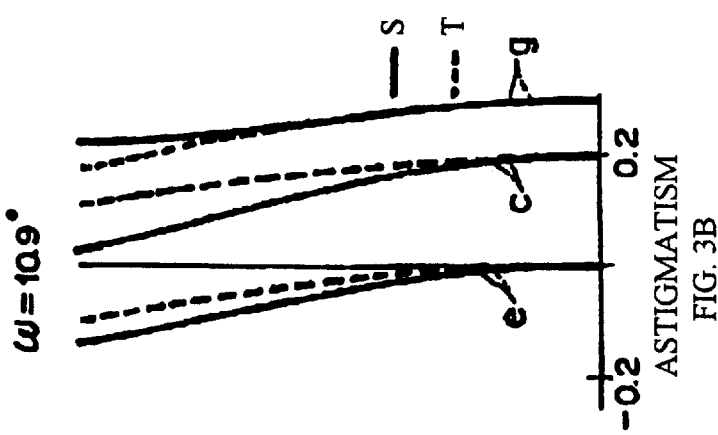
FIG. 3B ASTIGMATISM
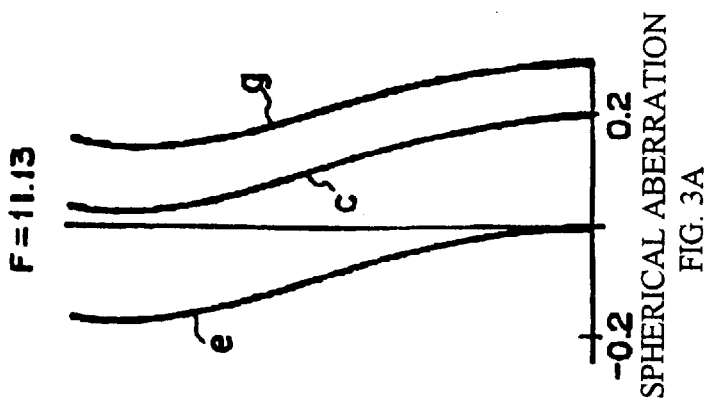
FIG. 3A SPHERICAL ABERRATION

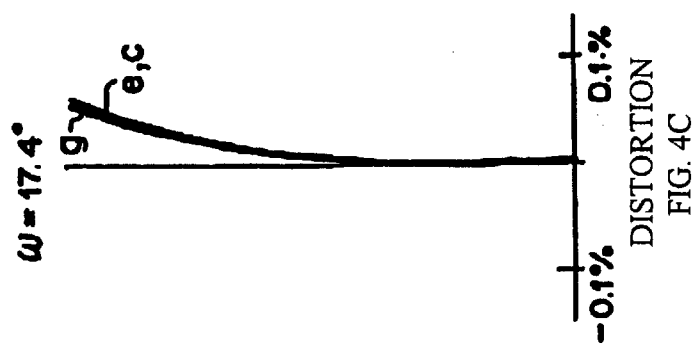
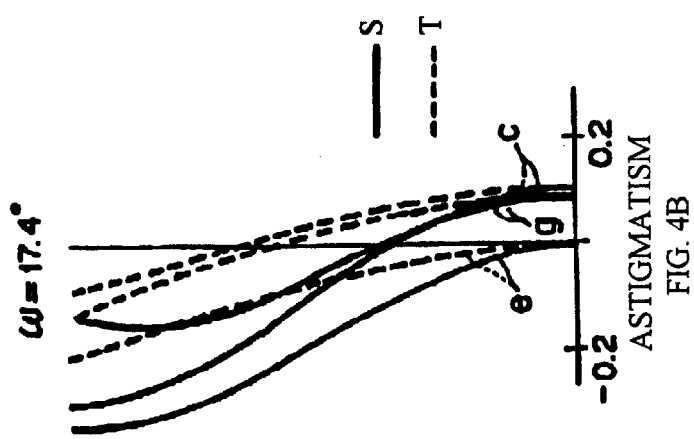
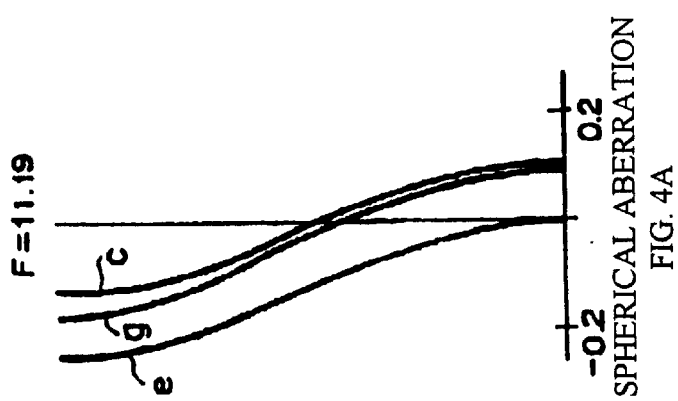

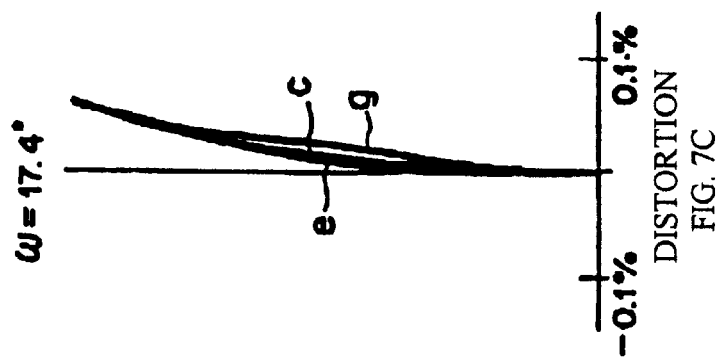
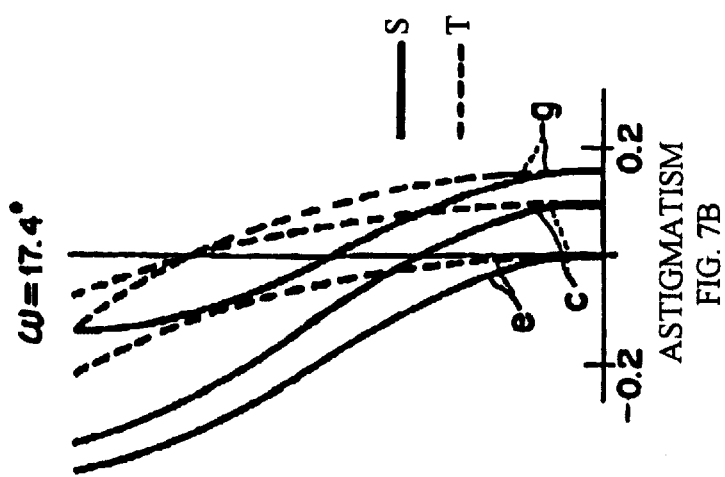
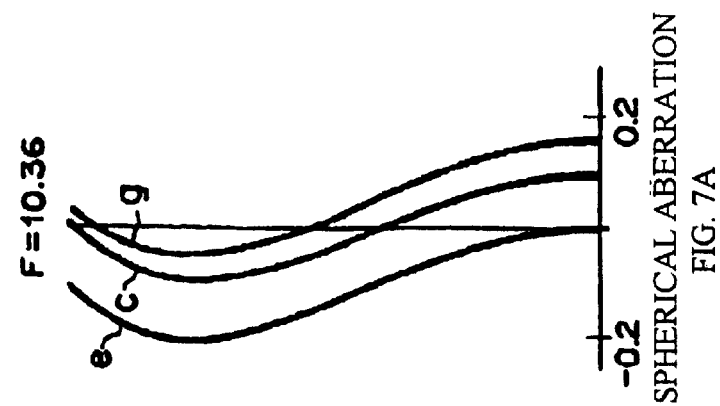

FIG. 8C DISTORTION
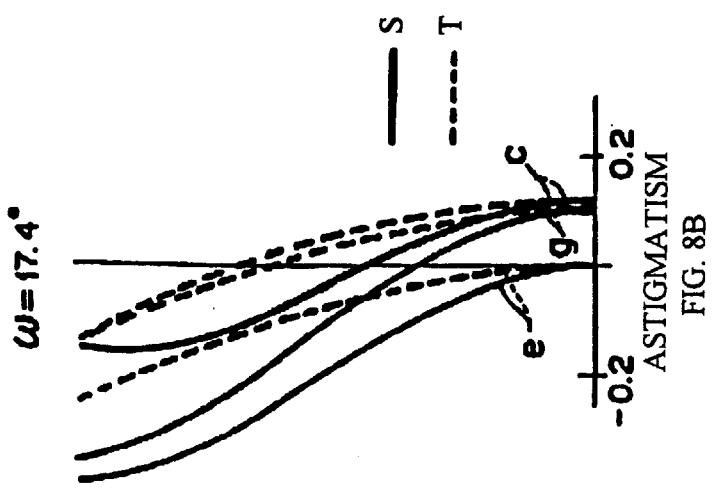
FIG. 8B ASTIGMATISM
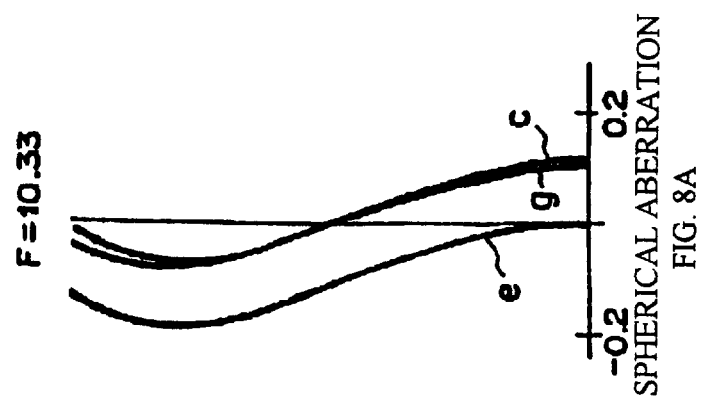
FIG. 8A SPHERICAL ABERRATION

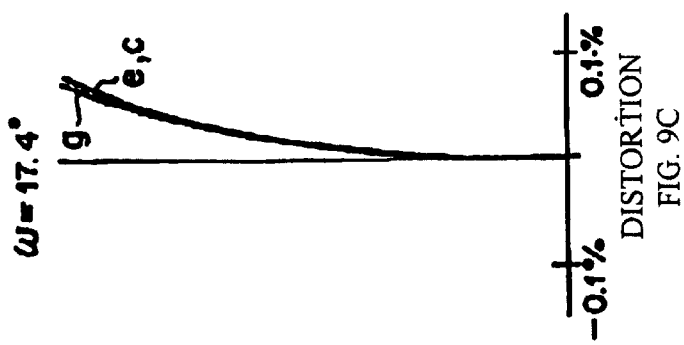
FIG. 9C DISTORTION
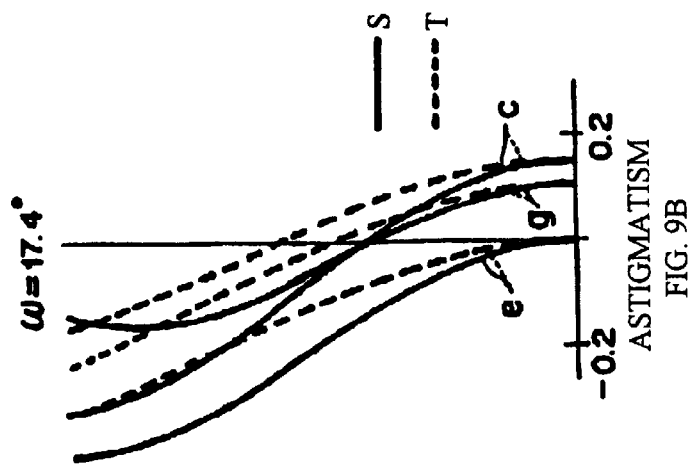
FIG. 9B ASTIGMATISM
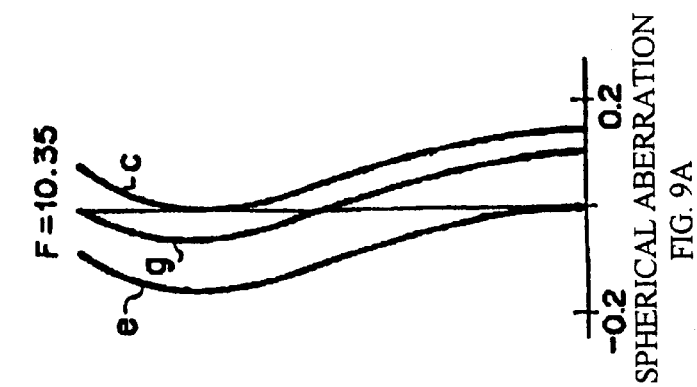
FIG. 9A SPHERICAL ABERRATION

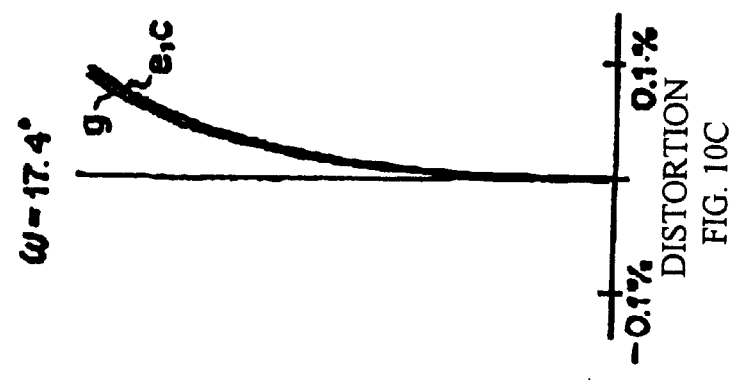
FIG. 10C DISTORTION
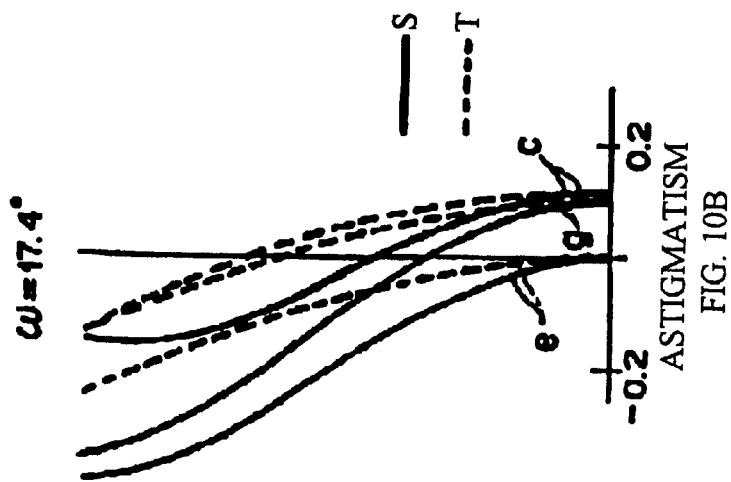
FIG. 10B ASTIGMATISM
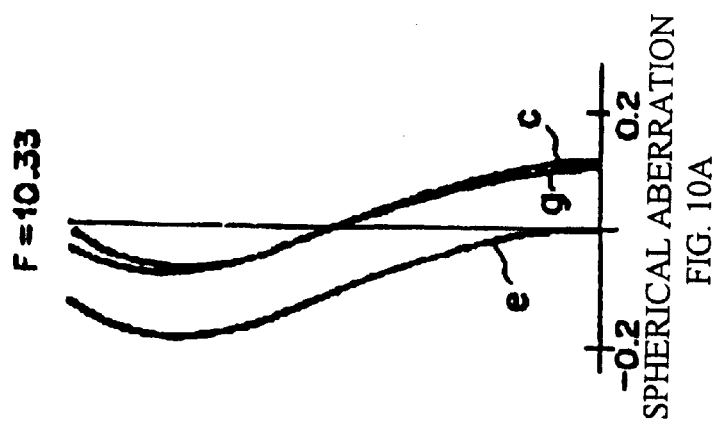
FIG. 10A SPHERICAL ABERRATION

LENS SYSTEM FOR READING IMAGES AND IMAGE READER

BACKGROUND OF THE INVENTION

In the prior art, solid-state image sensors, which generally are composed of a CCD array, are employed as a photosensitive member positioned at the image surface of image readers, such as facsimile machines and image scanners. For image readers, high quality imaging even at the periphery of the image field, with small distortion in red, green, and blue colors on the CCD array is required. It is also required that other aberrations be favorably corrected at a magnification of approximately 0.75 so that high spatial frequencies of the image may be resolved by the image sensor.

As a lens system for reading images which satisfies the requirements described above, JP Patent No. 2790919 and Japanese Laid Open Patent Application H09-304696 describe a lens system for reading images, comprising six lens elements. In addition, Japanese Laid Open Patent Application H09-281459 describes a lens system for reading images, especially narrow angle images.

However, much better images are demanded in recent image readers such as color copiers. Therefore, there is a need of a lens system for reading images which more favorably corrects aberrations so as to achieve higher resolution in image readers.

BRIEF SUMMARY OF THE INVENTION

A first object of the present invention is to provide a lens system for reading images that favorable corrects aberrations even at wide angles, is compact, and yet has a low f-number so as to yield a bright image. A second object of the invention is to provide an image reader that employs such a lens system.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 3A–3C show the spherical aberration, astigmatism, and distortion, respectively, of Embodiment 2, FIGS. 4A–4C show the spherical aberration, astigmatism, and distortion, respectively, of Embodiment 3, FIGS. 7A–7C show the spherical aberration, astigmatism, and distortion, respectively, of Embodiment 6, FIGS. 8A–8C show the spherical aberration, astigmatism, and distortion, respectively, of Embodiment 7, FIGS. 9A–9C show the spherical aberration, astigmatism, and distortion, respectively, of Embodiment 8, FIGS. 10A–10C show the spherical aberration, astigmatism, and distortion, respectively, of Embodiment 9.

DETAILED DESCRIPTION

Figure 1:
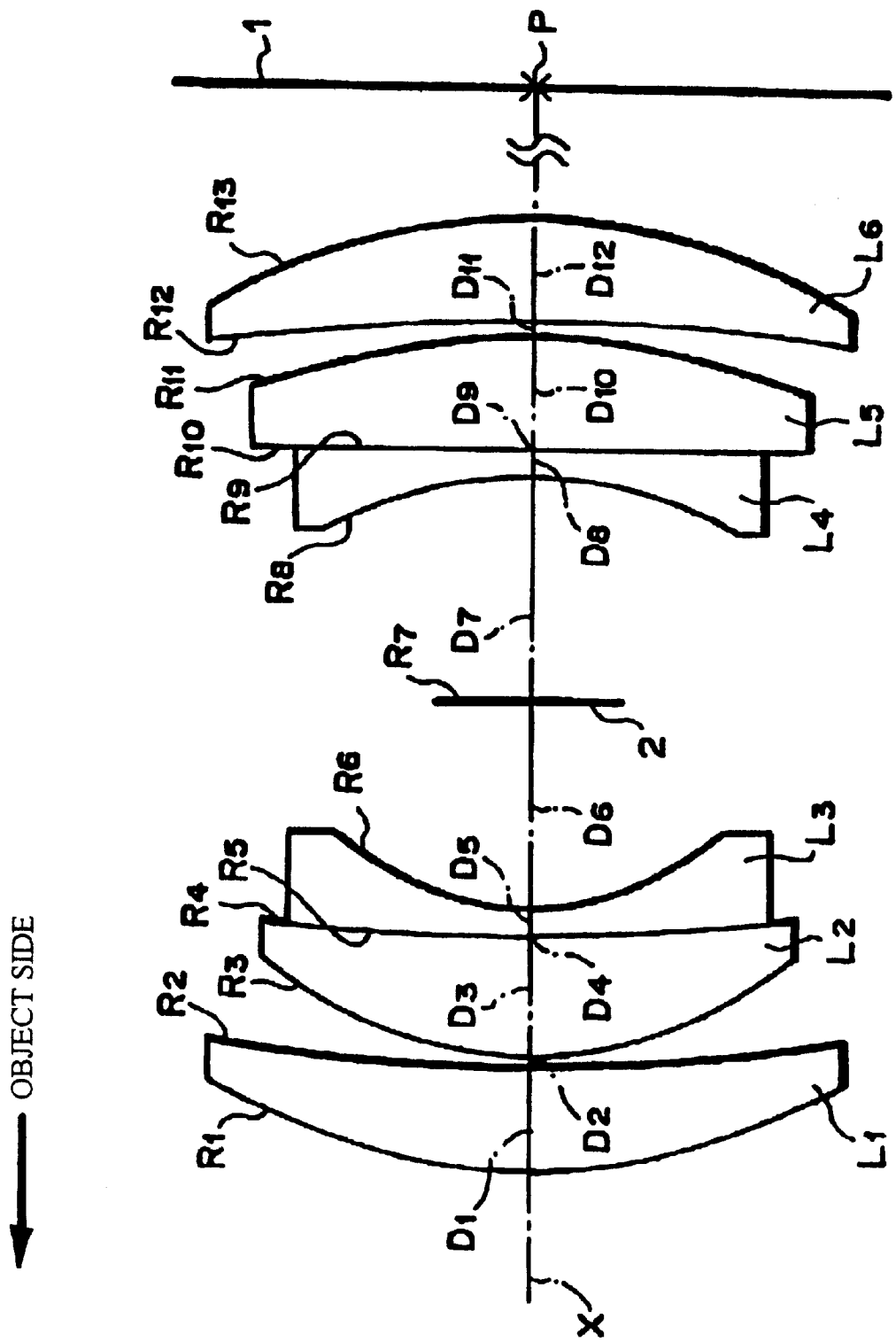
FIG. 1 shows the basic lens element configuration of Embodiments 1–9 of the invention.

The present invention relates to an image reader, such as facsimiles and image scanners, and a lens system for reading images which is used as the optical system in the image reader, especially for reducing or enlarging the image size.

A lens system for reading images according to the present invention comprises, in order from the object side: a first lens element which has positive refractive power and a convex surface on the object side, a second lens element which has positive refractive power and a convex surface on the object side, a third lens element which has negative refractive power and a concave surface on the image side, a fourth lens element which has negative refractive power and a concave surface on the object side, a fifth lens element which has positive refractive power and a convex surface on the image side, and a sixth lens element which has positive refractive power and a convex surface on the image side. The lens system includes a stop positioned between the third lens element and the fourth lens element. Further, the lens elements of at least one pair of the following two pairs of lens elements are coupled together, namely (a) the second lens element and the third lens element, or (b) the fourth lens element and the fifth lens element. Further, the following Conditions (1) and (2) are satisfied:

| | |
|---|---|
| $80(\theta_+ - 1) + \nu_{d+} > 44$ | Condition (1) |
| $\nu_{d+} > 60$ | Condition (2) | where $\theta_+$ is the partial dispersion ratio of the second lens element as well as of the fifth lens element, defined as $\theta_+$ equals the $(N_g - N_f)/(N_f - N_c)$, with $N_g$, $N_f$, and $N_c$ being the index of refraction at the g, f, and c lines, and $\nu_{d+}$ is the Abbe number of the second lens element as well as of the fifth lens element.

The lens system for reading images according to the present invention may satisfy the following Conditions (3) and (4) in addition to the Conditions (1) and (2):

| | |
|---|---|
| $160 < \nu_2 + \nu_5 < 170$ | Condition (3) |
| $23 < \nu_+ - \nu_- < 28$ | Condition (4) | where $\nu_2$ is the Abbe number of the second lens element, in order from the object side, $\nu_5$ is the Abbe number of the fifth lens element, in order from the object side, $\nu_+$ is the mean of the Abbe numbers of the positive lens elements, and $\nu_-$ is the mean of the Abbe numbers of the negative lens elements.

Another embodiment of the lens system for reading images according to the present invention comprises, in order from the object side: a first lens element which has positive refractive power and a convex surface on the object side, a second lens element which has positive refractive power and a convex surface on the object side, a third lens element which has negative refractive power and a concave surface on the image side, a fourth lens element which has negative refractive power and a concave surface on the object side, a fifth lens element which has positive refractive power and a convex surface on the image side, and a sixth lens element which has positive refractive power and a convex surface on the image side. As before, a stop is positioned between the third lens element and the fourth lens element, at least one of the following two pairs of lens elements are coupled together, namely, (a) the second lens element and the third lens element, or (b) the fourth lens element and the fifth lens element. Further, the following Conditions (5) to (7) are satisfied:

| | |
|---|---|
| $f_1 / f \leq 0.64$ | Condition (5) |
| $v_{d+} > 63$ | Condition (6) |
| $\|f_{2S} / f\| \leq 0.4$ | Condition (7) | where f is the focal length of the lens system, $f_1$ is the focal length of the first lens element, $\upsilon_{d+}$ is the Abbe number of the second lens element as well as of the fifth lens element, and $f_{2S}$ is the composite focal length of the second through fifth lens elements.

In addition to satisfying Conditions (5) to (7), the lens system for reading images according to the invention may also satisfy Condition (8):

| | |
|---|---|
| $76 < v_3 + v_4 < 82$ | Condition (8) | where $\upsilon_3$ is the Abbe number of the third lens element, and $\upsilon_4$ is the Abbe number of the fourth lens element.

Another embodiment of the lens system for reading images according to the present invention comprises, in the order from the object side: a first lens element which has positive refractive power and a convex surface on the object side, a second lens element which has positive refractive power and a convex surface on the object side, a third lens element which has negative refractive power and a concave surface on the image side, a fourth lens element which has negative refractive power and a concave surface on the object side, a fifth lens element which has positive refractive power and a convex surface on the image side, and a sixth lens element which has positive refractive power and a convex surface on the image side. Once again, a stop is positioned between the third lens element and the fourth lens element, and at least one of the following two pairs of lens elements, namely, (a) the second and third lens elements, and (b) the fourth and fifth lens elements, are coupled together. Further, the following Conditions (9) to (11) are satisfied:

| | |
|---|---|
| $f_1 / f \leq 0.60$ | Condition (9) |
| $v_{d+} > 63$ | Condition (10) |
| $23 < v_+ - v_- < 26$ | Condition (11) | where f is the focal length of the lens system, $f_1$ is the focal length of the first lens element, $\upsilon_{d+}$ is the Abbe number of the second lens element as well as of the fifth lens element, $\upsilon_+$ is the mean of the Abbe numbers of the positive lens elements, $\upsilon_-$ is mean of the Abbe numbers of the negative lens elements.

Furthermore, an image reader according to the present invention is characterized in that the lens system according to the present invention, as described above, is used. The lens system for reading images according to the present invention will now be described in general terms with reference to the drawings.

Figure 11:
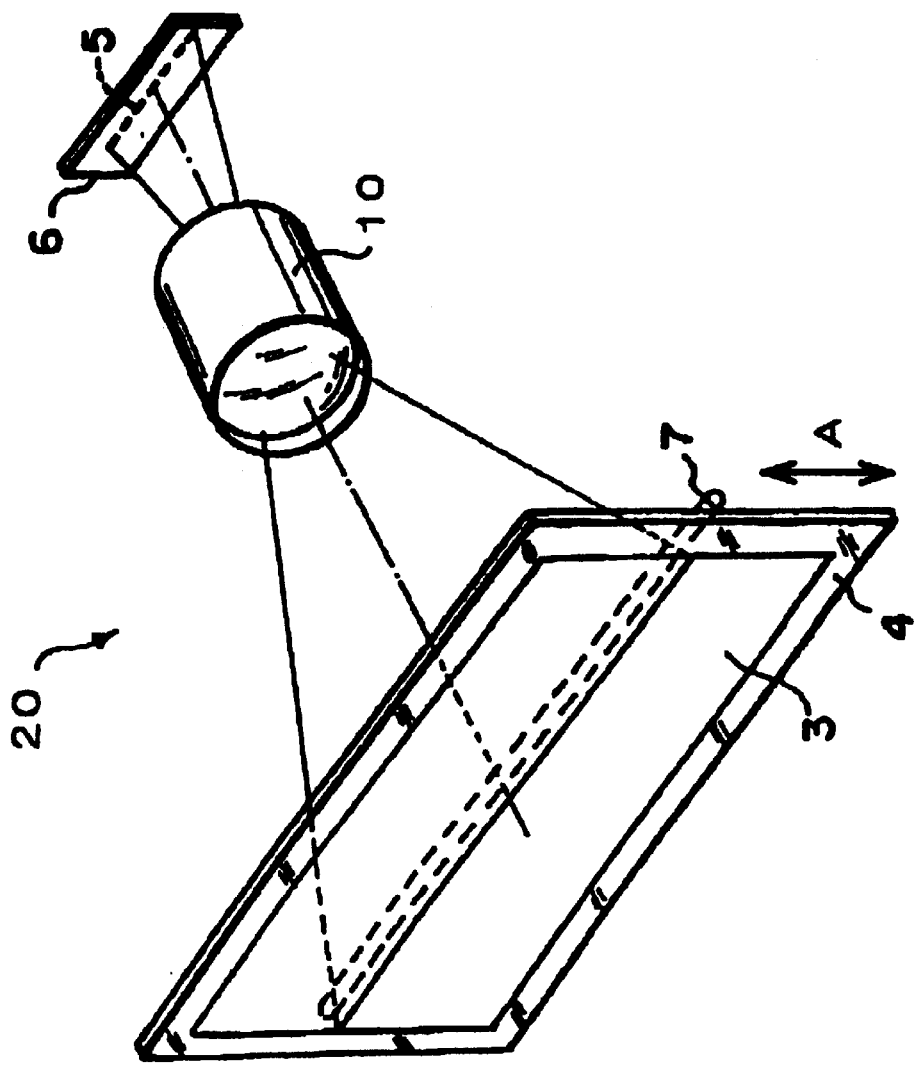
FIG. 11 shows an image reader using the lens system according to the present invention.

As is shown in FIG. 11, an image reader 20 according to the present invention, such as an image scanner, uses the lens system 10 of the present invention for reading images. The image reader 20 includes the lens system 10 positioned between a glass plate 4 on which an original document to be read is placed, and a CCD cover glass 6 for one or more linear CCD array(s) 5 that are arranged in a line. An illumination unit 7 is positioned at the glass plate 4 on the object side of the lens system 10.

In the image reader 20, the image of the original 3 may be read by moving the original in the direction A, which is orthogonal to the direction in which the CCD array(s) 5 is (are) arranged, in relation to the optical axis of the lens system 10.

FIG. 1 shows the basic lens element configuration of Embodiments 1–9. As is shown in FIG. 1, the lens system according to the invention for reading images consists of six lens elements $L_1$–$L_6$, wherein at least one pair of lens elements (among the second lens element $L_2$ and the third lens element $L_3$, and the fourth lens element $L_4$ and the fifth lens element $L_5$) are coupled together, respectively. In FIG. 1, two pairs of lens elements are coupled together, for example, by being cemented so as to provide a configuration of six lens elements divided into four lens groups, and a stop 2 is positioned between the third lens element $L_3$ and the fourth lens element $L_4$. Light coming from the object passes through the lens system and is focused at an image plane 1 positioned at point P on the optical axis X.

In FIG. 1, the first lens element $L_1$ is a positive meniscus lens with its convex surface on the object side. The second lens element $L_2$ is a piano-convex lens (biconvex in Embodiment 6) with its convex surface on the object side. The third lens element $L_3$ is a plano-concave lens (biconcave in Embodiment 6) with its concave surface on the image side. The fourth lens element $L_4$ is a negative meniscus lens with its concave surface on the object side. The fifth lens element $L_5$ is a positive meniscus lens with its convex surface on the image side. The sixth lens element $L_6$ is a positive meniscus lens with its convex surface on the image side.

It is preferred that at least one of the following surface pairs, namely, (a) the adjacent surfaces of the second lens element $L_2$ and the third lens element $L_3$, and (b) the adjacent surfaces of the fourth lens element $L_4$ and the fifth lens element $L_5$, be coupled, such as by being cemented. The adjacent surfaces of $L_2$ and $L_3$ may be planar or curved. Examples of these surfaces being planar are Embodiments 1–5, 7 and 8. In Embodiment 6, the coupled surface between the second lens element and the third lens element has its center of curvature to the left. This configuration enables more satisfactory correction of chromatic aberration because it enables the third lens element, which is made of low dispersion glass, to be biconcave and thus have greater refractive power.

Only one of the above-mentioned two pairs of lens elements need be coupled. Normally the coupling is by the adjacent surfaces, which must have the same radius of curvature, being cemented together.

The lens systems for reading images according to each Embodiment satisfy the above Conditions (1)–(11).

Furthermore, it is preferred that the lens system for reading images according to each Embodiment satisfy the following Conditions (12)–(14):

| | |
|---|---|
| $0.25 < f_{56} / f < 0.28$ | Condition (12) |
| $0.2 < D_{L3-L4} / f$ | Condition (13) |
| $0.01 < D_{L4} / f$ | Condition (14) | where
- $f_{56}$ is the composite focal length of the fifth lens element and the sixth lens element,
- f is as defined above,
- $D_{L3-L4}$ is the on-axis distance between the third lens element and the fourth lens element, and
- $D_{L4}$ is the on-axis thickness of the fourth lens element.

When Condition (9) above is satisfied, the first lens element $L_1$ and the sixth lens element $L_6$ are, preferably, each a positive meniscus lens. With such a design, spherical aberration and curvature of field may be favorably corrected.

The purpose of Conditions (1)–(14) will now be described. Conditions (1) and (2) above relate to the partial dispersion ratio $\theta_+$ and the Abbe number of the lens material. Conditions (1) and (2) specify the partial dispersion ratio and the Abbe number of the second lens element $L_2$ as well as the fifth lens element $L_5$ in order to satisfactorily correct for chromatic aberration. Unless Conditions (1) and (2) are satisfied, chromatic aberration may not be satisfactorily corrected because of insufficient anomalous dispersion.

Condition (3) defines the sum of the Abbe numbers $\upsilon_2 + \upsilon_5$ of the second lens element $L_2$ and the fifth lens element $L_5$, respectively, in order to allow the blue, red and green images to be focused on the same plane. When the sum $\upsilon_2 + \upsilon_5$ in Condition (3) exceeds the lower limit, blue and red images are shifted less than the green images. On the other hand, when the sum $\upsilon_2 + \upsilon_5$ exceeds the upper limit, blue and red images are shifted more than green images. In both cases, the three images are not focused on the same plane.

Conditions (4) and (11) define the difference in Abbe numbers $\upsilon_+$ and $\upsilon_-$ (i.e., between the mean of the Abbe numbers of the positive versus the negative lens elements) in order to satisfactorily correct chromatic aberration on the axis. When the difference between $\upsilon_+$ and $\upsilon_-$ in Conditions (4) and (11) exceeds the upper limit, there is excessive correction, resulting in the chromatic aberration on the axis shifting in the positive direction at shorter wavelengths than the main wavelength. On the other hand, when the difference between $\upsilon_+$ and $\upsilon_-$ exceeds the lower limit, there is insufficient correction, resulting in the chromatic aberration on the axis shifting in the negative direction at shorter wavelengths than the main wavelength.

Conditions (5) and (9) specify the ratio $f_1/f$ of the focal length $f_1$ of the first lens element $L_1$ relative to the focal length f of the lens system, in order to satisfactorily correct for curvature of field and distortion. When the values of $f_1/f$ in Conditions (5) and (9) are not satisfied, the curvature of field becomes excessive or there is too much negative distortion.

Conditions (6) and (10) specify the Abbe number value $\upsilon_{d+}$ of the second lens element $L_2$ or the fifth lens element $L_5$, in order to satisfactorily correct chromatic aberration on the axis and at the periphery. When the value $\upsilon_{d+}$ in Conditions (6) and (10) becomes outside of the predetermined range, chromatic aberration on the axis and at the periphery may be excessive.

Condition (7) specifies the refractive power of the composite lens elements $L_2$ through $L_5$, relative to the focal length of the lens system. Coma flare is prevented from increasing by defining the absolute ratio $|f_{25}/f|$ (i.e., the ratio of the resultant focal length $f_{25}$ of the composite lens elements $L_2$–$L_5$ divided by the focal length f of the lens system). When Condition (7) is not satisfied, coma becomes excessive.

Condition (8) defines the sum of the Abbe numbers $\upsilon_3 + \upsilon_4$ of the third lens element $L_3$ and the fourth lens element $L_4$, respectively, in order to allow blue, red and green images to be focused on the same plane. When the sum $\upsilon_3 + \upsilon_4$ in Condition (8) exceeds the lower limit, blue and red images are shifted more than green images. On the other hand, when the sum $\upsilon_3 + \upsilon_4$ exceeds the upper limit, blue and red images are shifted less than green images. In both cases, the three color images are not focused on the same plane.

Condition (12) specifies the composite focal length, in air, of the fifth and sixth lens elements, relative to the focal length of the lens system. Spherical aberration may be satisfactorily corrected by defining the ratio $f_{56}/f$. When the value of $f_6/f$ in Condition (12) does not satisfy the lower limit, spherical aberration may be insufficiently corrected. On the other hand, when the value of $f_{56}/f$ exceeds the upper limit, spherical aberration may be over-corrected.

Condition (13) defines the ratio $D_{L3-L4}/f$ (i.e., the distance between the third lens element $L_3$ and the fourth lens element $L_4$, divided by the focal length f of the lens system), in order to satisfactorily correct curvature of field.

Condition (14) specifies the ratio $D_{L4}/f$ (i.e., the ratio of the on-axis thickness $D_{L4}$ of the fourth lens element $L_4$ divided by the focal length f of the lens system) in order to satisfactorily correct for spherical aberration and curvature of field.

Embodiments 1–9 will now be explained in detail.

Embodiment 1

Table 1 below lists the surface number #, in order from the object side, the radius of curvature R (in mm) of each surface, the on-axis spacing D (in mm) between the surfaces, as well as the refractive index $N_e$ (relative to the e line) and the Abbe number $\upsilon_d$ (relative to the d line) of each lens element of Embodiment 1. In the middle portion of the table are listed the focal length f, the magnification $\beta$, the reference wavelength $\lambda$, and the half-image angle $\omega$, as well as the values of $N_g$, $N_f$, and $N_c$ for the second and fifth lens elements, in order from the object side. In the bottom portion of the table are listed the value for each condition that is satisfied by the present embodiment.

TABLE

| # | R | D | $N_e$ | $\upsilon_d$ |
|---|---|---|---|---|
| 1 | 33.25 | 5.67 | 1.7608 | 47.8 |
| 2 | 128.53 | 0.73 | | |
| 3 | 42.84 | 6.04 | 1.4985 | 81.5 |
| 4 | ∞ | 0.00 | | |
| 5 | ∞ | 1.48 | 1.6580 | 39.7 |
| 6 | 25.04 | 12.25 | | |
| 7 | (stop) | 11.28 | | |
| 8 | −16.36 | 1.46 | 1.6580 | 39.7 |
| 9 | −148.39 | 0.00 | | |
| 10 | −148.39 | 6.67 | 1.4985 | 81.5 |
| 11 | −23.59 | 0.34 | | |
| 12 | −111.13 | 5.52 | 1.7992 | 45.3 |
| 13 | −34.51 | | | | f = 101 mm  $\beta$ = −0.75668  $\lambda$ = 546.070 nm  $\omega$ = 17.193°
$N_g$ = 1.50451  $N_f$ = 1.50123  $N_c$ = 1.49514
Condition (1)  $80(\theta_+ - 1) + \upsilon_{d+}$ =  44.5
Conditions (2), (6) & (10)  $\upsilon_{d+}$ =  81.5

TABLE-continued

| | | |
|---|---|---|
| Condition (3) | $v_2 + v_5 =$ | 163.1 |
| Conditions (4) & (11) | $v_+ - v_- =$ | 24.3 |
| Conditions (5) & (9) | $f_1 / f =$ | 0.5691 |
| Condition (7) | $|f_{25} / f| =$ | 0.3460 |
| Condition (8) | $v_3 + v_4 =$ | 79.4 |
| Condition (12) | $f_{56} / f =$ | 0.2726 |
| Condition (13) | $D_{L3-L4} / f =$ | 0.2330 |
| Condition (14) | $D_{L4} / f =$ | 0.0144 |

Figure 2C:
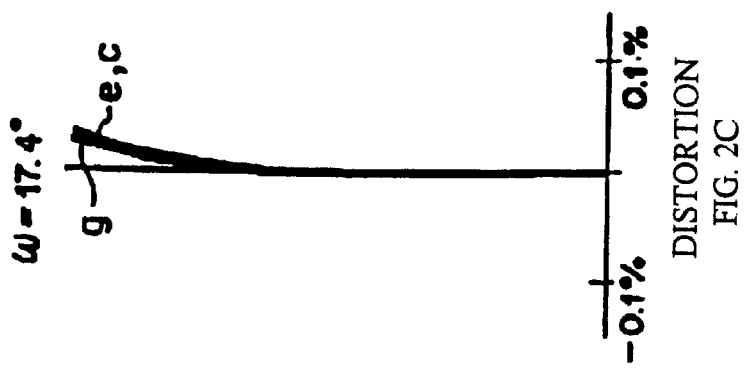
FIGS. 2A–2C show the spherical aberration, astigmatism, and distortion, respectively, of Embodiment 1.
Figure 2B:
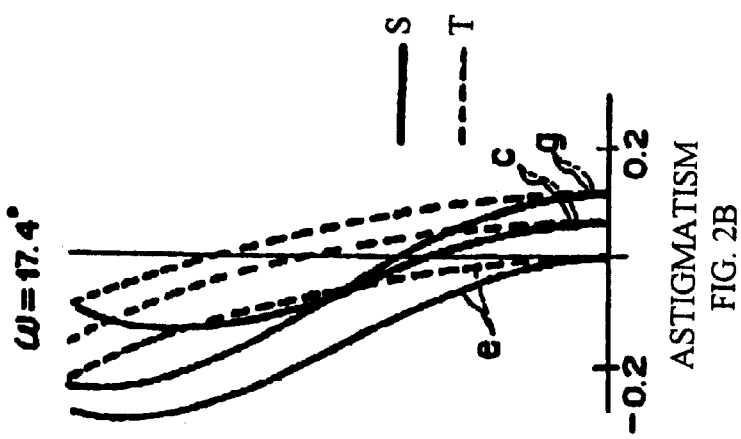
Figure 2A:
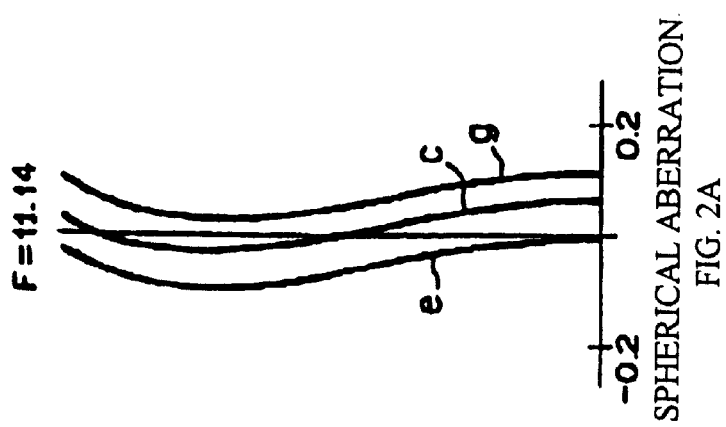

As is apparent from Table 1, Conditions (1) to (14) are each satisfied in Embodiment 1. FIGS. 2A, 2B and 2C show the spherical aberration (in mm), astigmatism (in mm) in the sagittal S and tangential T planes, and distortion, respectively, for each of the e, c, and g lines for this embodiment. The wavelength of the e line is 546.07 nm, the wavelength of the g line is 435.84 nm, and the wavelength of the c line is 656.27 nm. Axial chromatic aberration and coma are satisfactorily corrected. Therefore, high resolution image reading is realized.

Embodiment 2

Table 2 below lists the surface number #, in order from the object side, the radius of curvature R (in mm) of each surface, the on-axis spacing D (in mm) between the surfaces, as well as the refractive index $N_e$ (relative to the e line) and the Abbe number $v_d$ (relative to the d line) of each lens element of Embodiment 2. In the middle portion of the table are listed the focal length f, the magnification β, the reference wavelength λ, and the half-image angle ω, as well as the values of $N_g$, $N_f$, and $N_c$ for the second and fifth lens elements in order from the object side. In the bottom portion of the table are listed the value for each condition that is satisfied by the present embodiment.

TABLE 2

| # | R | D | $N_e$ | $v_d$ |
|---|---|---|---|---|
| 1 | 33.89 | 5.46 | 1.7920 | 47.4 |
| 2 | 116.60 | 0.29 | | |
| 3 | 39.03 | 6.03 | 1.4985 | 81.5 |
| 4 | ∞ | 0.00 | | |
| 5 | ∞ | 2.81 | 1.6580 | 39.7 |
| 6 | 22.84 | 12.34 | | |
| 7 | (stop) | 12.49 | | |
| 8 | −15.96 | 2.02 | 1.6580 | 39.7 |
| 9 | −51.07 | 0.00 | | |
| 10 | −51.07 | 5.73 | 1.4985 | 81.5 |
| 11 | −20.78 | 0.74 | | |
| 12 | −111.65 | 5.56 | 1.7762 | 49.6 |
| 13 | <37.72 | | | | f = 100 mm   β = −0.75642   λ = 546.070 nm   ω = 10.657°
$N_g$ = 1.50451   $N_f$ = 1.50123   $N_c$ = 1.49514

| | | |
|---|---|---|
| Condition (1) | $80(\theta_+ - 1) + v_{d+} =$ | 44.5 |
| Conditions (2), (6) & (10) | $v_{d+} =$ | 81.5 |
| Condition (3) | $v_2 + v_5 =$ | 163.1 |
| Conditions (4) & (11) | $v_+ - v_- =$ | 25.3 |
| Conditions (5) & (9) | $f_1 / f =$ | 0.5861 |
| Condition (8) | $v_3 + v_4 =$ | 79.4 |
| Condition (12) | $f_{56} / f =$ | 0.2683 |
| Condition (13) | $D_{L3-L4} / f =$ | 0.2483 |
| Condition (14) | $D_{L4} / f =$ | 0.0202 |

As is apparent from Table 2, the Conditions (1) to (6) and (8) to (14) are satisfied in Embodiment 2. FIGS. 3A, 3B and 3C show the spherical aberration (in mm), astigmatism (in mm) in the sagittal S and tangential T planes, and distortion, respectively, for each of the e, c, and g lines for this embodiment. The wavelength of the e line is 546.07 nm, the wavelength of the g line is 435.84 nm, and the wavelength of the c line is 656.27 nm. Axial chromatic aberration and coma are satisfactorily corrected. Therefore, high resolution image reading is realized.

Embodiment 3

Table 3 below lists the surface number #, in order from the object side, the radius of curvature R (in mm) of each surface, the on-axis spacing D (in mm) between the surfaces, as well as the refractive index $N_e$ (relative to the e line) and the Abbe number $v_d$ (relative to the d line) of each lens element of Embodiment 3. In the middle portion of the table are listed the focal length f, the magnification β, the reference wavelength λ, and the half-image angle ω, as well as the values of $N_g$, $N_f$, and $N_c$ for the second and fifth lens elements in order from the object side. In the bottom portion of the table are listed the value for each condition that is satisfied by the present embodiment.

TABLE 3

| # | R | D | $N_e$ | $v_d$ |
|---|---|---|---|---|
| 1 | 31.94 | 5.91 | 1.7598 | 47.6 |
| 2 | 121.16 | 0.93 | | |
| 3 | 40.49 | 5.13 | 1.4985 | 81.5 |
| 4 | ∞ | 0.00 | | |
| 5 | ∞ | 1.50 | 1.6580 | 39.7 |
| 6 | 23.96 | 11.83 | | |
| 7 | (stop) | 10.99 | | |
| 8 | −16.47 | 1.46 | 1.6580 | 39.7 |
| 9 | −131.45 | 0.00 | | |
| 10 | −131.45 | 6.48 | 1.4985 | 81.5 |
| 11 | −23.83 | 0.69 | | |
| 12 | −106.73 | 5.19 | 1.7992 | 45.2 |
| 13 | −34.32 | | | | f = 100 mm   β = −0.75668   λ = 546.070 nm   ω = 17.228°
$N_g$ = 1.50451   $N_f$ = 1.50123   $N_c$ = 1.49514

| | | |
|---|---|---|
| Condition (1) | $80(\theta_+ - 1) + v_{d+} =$ | 44.5 |
| Conditions (2), (6) & (10) | $v_{d+} =$ | 81.5 |
| Condition (3) | $v_2 + v_5 =$ | 163.1 |
| Conditions (4) & (11) | $v_+ - v_- =$ | 24.3 |
| Conditions (5) & (9) | $f_1 / f =$ | 0.5551 |
| Condition (7) | $|f_{25} / f| =$ | 0.3420 |
| Condition (8) | $v_3 + v_4 =$ | 79.4 |
| Condition (12) | $f_{56} / f =$ | 0.2781 |
| Condition (13) | $D_{L3-L4} / f =$ | 0.2282 |
| Condition (14) | $D_{L4} / f =$ | 0.0146 |

As is apparent from Table 3, the Conditions (1) to (14) are all satisfied in Embodiment 3. FIGS. 4A, 4B and 4C show the spherical aberration, astigmatism in the sagittal S and tangential T planes, and distortion, respectively, for each of the e, c, and g lines for this embodiment. The wavelength of the e line is 546.07 nm, the wavelength of the g line is 435.84 nm, and the wavelength of the c line is 656.27 nm. Axial chromatic aberration and coma are satisfactorily corrected. Therefore, high resolution image reading is realized.

Embodiment 4

Table 4 below lists the surface number #, in order from the object side, the radius of curvature R (in mm) of each surface, the on-axis spacing D (in mm) between the surfaces, as well as the refractive index $N_e$ (relative to the e line) and the Abbe number $v_d$ (relative to the d line) of each lens element of Embodiment 4. In the middle portion of the table are listed the focal length f, the magnification β, the reference wavelength λ, and the half-image angle ω, as well as the values of $N_g$, $N_f$, and $N_c$ for the second and fifth lens elements in order from the object side. In the bottom portion of the table are listed the value for each condition that is satisfied by the present embodiment.

TABLE 4

| # | R | D | $N_e$ | $\nu_d$ |
|---|---|---|---|---|
| 1 | 32.05 | 5.76 | 1.7762 | 49.6 |
| 2 | 111.86 | 0.90 | | |
| 3 | 43.84 | 5.54 | 1.4985 | 81.5 |
| 4 | ∞ | 0.00 | | |
| 5 | ∞ | 1.49 | 1.6580 | 39.7 |
| 6 | 24.79 | 11.87 | | |
| 7 | (stop) | 11.90 | | |
| 8 | −15.49 | 1.46 | 1.6580 | 39.7 |
| 9 | −45.08 | 0.00 | | |
| 10 | −45.08 | 5.87 | 1.4985 | 81.5 |
| 11 | −20.98 | 0.69 | | |
| 12 | −92.72 | 4.93 | 1.7762 | 49.6 |
| 13 | −34.92 | | | | f = 100 mm  β = −0.75674  λ = 546.070 nm  ω = 17.223°
$N_g$ = 1.50451  $N_f$ = 1.50123  $N_c$ = 1.49514

| Condition (1) | $80(\theta_+ - 1) + \nu_{d+} =$ | 44.5 |
|---|---|---|
| Conditions (2), (6) & (10) | $\nu_{d+} =$ | 81.5 |
| Condition (3) | $\nu_2 + \nu_5 =$ | 163.1 |
| Conditions (4) & (11) | $\nu_+ - \nu_- =$ | 25.9 |
| Conditions (5) & (9) | $f_1 / f =$ | 0.5611 |
| Condition (7) | $|f_{25} / f| =$ | 0.3898 |
| Condition (8) | $\nu_3 + \nu_4 =$ | 79.4 |
| Condition (12) | $f_{56} / f =$ | 0.2662 |
| Condition (13) | $D_{L3-L4} / f =$ | 0.2378 |
| Condition (14) | $D_{L4} / f =$ | 0.0146 |

Figure 5C:
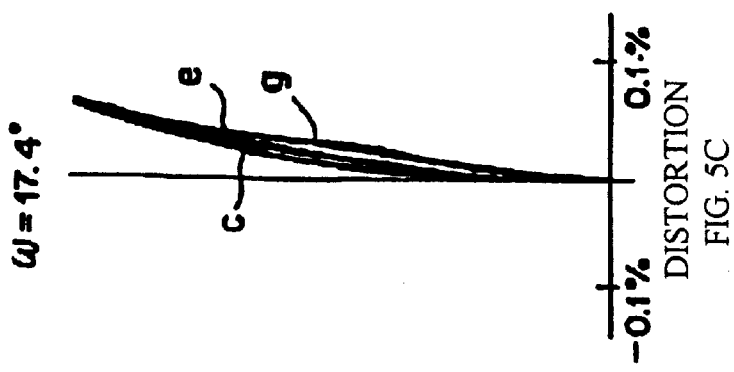
FIGS. 5A–5C show the spherical aberration, astigmatism, and distortion, respectively, of Embodiment 4.
Figure 5B:
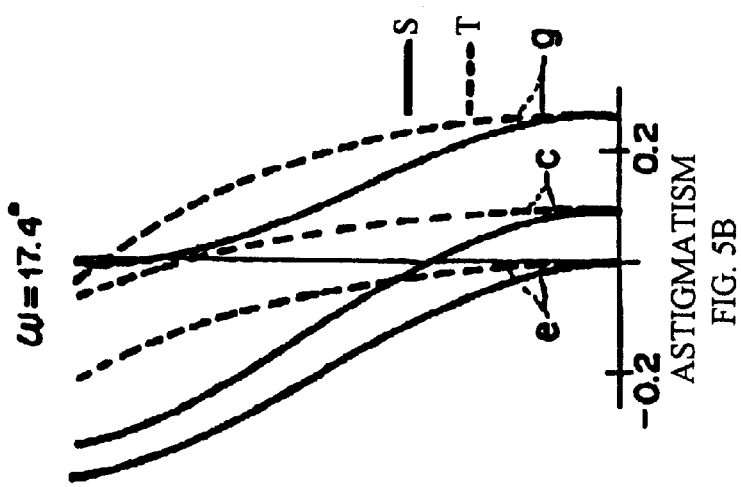
Figure 5A:
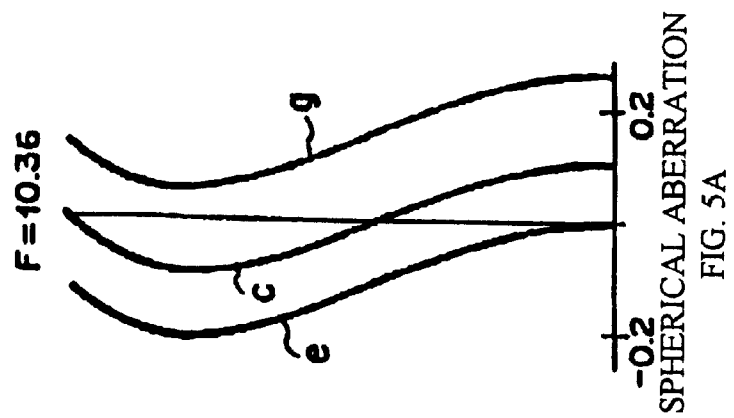

As is apparent from Table 4, Conditions (1) to (14) are all satisfied in Embodiment 4. FIGS. 5A, 5B and 5C show the spherical aberration, astigmatism in the sagittal S and tangential T planes, and distortion, respectively, for each of the e, c, and g lines for this embodiment. The wavelength of the e line is 546.07 nm, the wavelength of the g line is 435.84 nm, and the wavelength of the c line is 656.27 nm. Axial chromatic aberration and coma are satisfactorily corrected. Therefore, high resolution image reading is realized.

Embodiment 5

Table 5 below lists the surface number #, in order from the object side, the radius of curvature R (in mm) of each surface, the on-axis spacing D (in mm) between the surfaces, as well as the refractive index $N_e$ (relative to the e line) and the Abbe number $\nu_d$ (relative to the d line) of each lens element of Embodiment 5. In the middle portion of the table are listed the focal length f, the magnification β, the reference wavelength λ, and the half-image angle ω, as well as the values of $N_g$, $N_f$, and $N_c$ for the second and fifth lens elements in order from the object side. In the bottom portion of the table are listed the value for each condition that is satisfied by the present embodiment.

TABLE 5

| # | R | D | $N_e$ | $\nu_d$ |
|---|---|---|---|---|
| 1 | 30.80 | 6.01 | 1.8040 | 42.3 |
| 2 | 113.77 | 1.10 | | |
| 3 | 40.89 | 4.69 | 1.4985 | 81.5 |
| 4 | ∞ | 0.00 | | |
| 5 | ∞ | 1.48 | 1.7254 | 34.7 |
| 6 | 24.58 | 11.91 | | |
| 7 | (stop) | 11.92 | | |
| 8 | −14.80 | 1.45 | 1.7254 | 34.7 |
| 9 | −33.01 | 0.00 | | |
| 10 | −33.01 | 5.73 | 1.4985 | 81.5 |
| 11 | −19.20 | 0.69 | | |
| 12 | −93.51 | 4.71 | 1.8040 | 42.3 |
| 13 | −36.06 | | | | f = 100 mm  β = −0.75674  λ = 546.070 nm  ω = 17.164°
$N_g$ = 1.50451  $N_f$ = 1.50123  $N_c$ = 1.49514

TABLE 5-continued

| Condition (1) | $80(\theta_+ - 1) + \nu_{d+} =$ | 44.5 |
|---|---|---|
| Conditions (2), (6) & (10) | $\nu_{d+} =$ | 81.5 |
| Condition (3) | $\nu_2 + \nu_5 =$ | 163.1 |
| Conditions (4) | $\nu_+ - \nu_- =$ | 27.2 |
| Conditions (5) & (9) | $f_1 / f =$ | 0.5088 |
| Condition (7) | $|f_{25} / f| =$ | 0.3565 |
| Condition (12) | $f_{56} / f =$ | 0.2503 |
| Condition (13) | $D_{L3-L4} / f =$ | 0.2383 |
| Condition (14) | $D_{L4} / f =$ | 0.0145 |

Figure 6C:
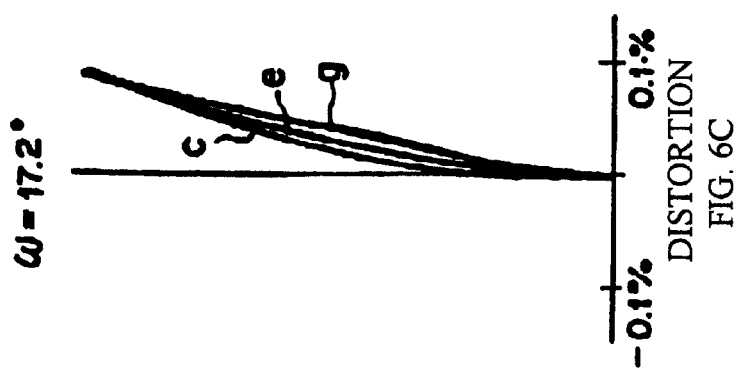
FIGS. 6A–6C show the spherical aberration, astigmatism, and distortion, respectively, of Embodiment 5.
Figure 6B:
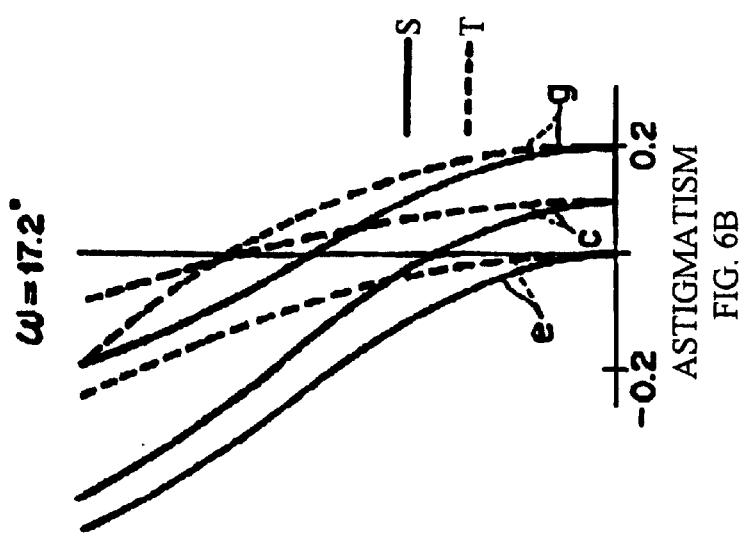
Figure 6A:
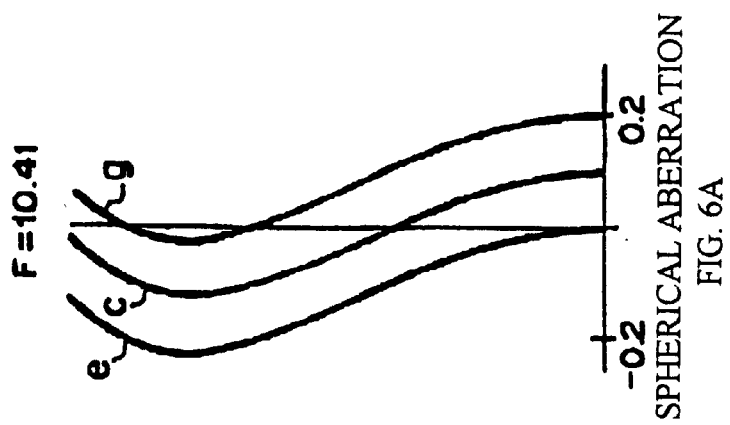

As is apparent from Table 5, the conditions (1) to (7), (9), (10), and (12) to (14) are satisfied in Embodiment 5. FIGS. 6A, 6B and 6C show the spherical aberration, astigmatism in the sagittal S and tangential T planes, and distortion, respectively, for each of the e, c, and g lines for this embodiment. The wavelength of the e line is 546.07 nm, the wavelength of the g line is 435.84 nm. and the wavelength of the c line is 656.27 nm. Axial chromatic aberration and coma are satisfactorily corrected. Therefore, high resolution image reading is realized.

Embodiment 6

Table 6 below lists the surface number #, in order from the object side, the radius of curvature R (in mm) of each surface, the on-axis spacing D (in mm) between the surfaces, as well as the refractive index $N_e$ (relative to the e line) and the Abbe number $\nu_d$ (relative to the d line) of each lens element of Embodiment 6. In the middle portion of the table are listed the focal length f, the magnification μ, the reference wavelength λ, and the half-image angle ω, as well as the values of $N_g$, $N_f$, and $N_c$ for the second and fifth lens elements in order from the object side. In the bottom portion of the table are listed the value for each condition that is satisfied by the present embodiment.

TABLE 6

| # | R | D | $N_e$ | $\nu_d$ |
|---|---|---|---|---|
| 1 | 33.59 | 5.86 | 1.7608 | 47.8 |
| 2 | 129.23 | 0.69 | | |
| 3 | 41.82 | 6.38 | 1.4985 | 81.5 |
| 4 | −1763.82 | 0.00 | | |
| 5 | −1763.82 | 1.48 | 1.6580 | 39.7 |
| 6 | 24.68 | 11.77 | | |
| 7 | (stop) | 11.72 | | |
| 8 | −16.33 | 1.45 | 1.6580 | 39.7 |
| 9 | −138.72 | 0.00 | | |
| 10 | −138.72 | 6.53 | 1.4985 | 81.5 |
| 11 | −23.51 | 0.34 | | |
| 12 | −110.73 | 5.35 | 1.7992 | 45.3 |
| 13 | −34.20 | | | | f = 100 mm  β = −0.75668  λ = 546.070 nm  ω = 17.181°
$N_g$ = 1.50451  $N_f$ = 1.50123  $N_c$ = 1.49514

| Condition (1) | $80(\theta_+ - 1) + \nu_{d+} =$ | 44.5 |
|---|---|---|
| Conditions (2), (6) & (10) | $\nu_{d+} =$ | 81.5 |
| Condition (3) | $\nu_2 + \nu_5 =$ | 163.1 |
| Conditions (4) & (11) | $\nu_+ - \nu_- =$ | 24.4 |
| Conditions (5) & (9) | $f_1 / f =$ | 0.5812 |
| Condition (7) | $|f_{25} / f| =$ | 0.3494 |
| Condition (8) | $\nu_3 + \nu_4 =$ | 79.4 |
| Condition (12) | $f_{56} / f =$ | 0.2730 |
| Condition (13) | $D_{L3-L4} / f =$ | 0.2349 |
| Condition (14) | $D_{L4} / f =$ | 0.0145 |

As is apparent from Table 6, Conditions (1)–(14) are all satisfied in Embodiment 6.

FIGS. 7A, 7B and 7C show the spherical aberration, astigmatism in the sagittal S and tangential T planes, and distortion, respectively, for each of the e, c, and g lines for this embodiment. The wavelength of the e line is 546.07 nm, the wavelength of the g line is 435.84 nm, and the wavelength of the c line is 656.27 nm. Axial chromatic aberration and coma are satisfactorily corrected. Therefore, high resolution image reading is realized.

Embodiment 7

Table 7 below lists the surface number #, in order from the object side, the radius of curvature R (in mm) of each surface, the on-axis spacing D (in mm) between the surfaces, as well as the refractive index $N_e$ (relative to the e line) and the Abbe number $\upsilon_d$ (relative to the d line) of each lens element of Embodiment 7. In the middle portion of the table are listed the focal length f, the magnification β, the reference wavelength λ, and the half-image angle ω, as well as the values of $N_g$, $N_f$, and $N_c$ for the second and fifth lens elements in order from the object side. In the bottom portion of the table are listed the value for each condition that is satisfied by the present embodiment.

TABLE 7

| # | R | D | $N_e$ | $\nu_d$ |
|---|---|---|---|---|
| 1 | 31.56 | 5.99 | 1.7598 | 47.6 |
| 2 | 119.92 | 0.75 | | |
| 3 | 40.83 | 4.88 | 1.4985 | 81.5 |
| 4 | ∞ | 0.00 | | |
| 5 | ∞ | 1.49 | 1.6580 | 39.7 |
| 6 | 24.14 | 12.17 | | |
| 7 | (stop) | 10.94 | | |
| 8 | −16.37 | 1.46 | 1.6580 | 39.7 |
| 9 | −119.24 | 0.00 | | |
| 10 | −119.24 | 6.59 | 1.4985 | 81.5 |
| 11 | −23.56 | 0.69 | | |
| 12 | −106.39 | 5.18 | 1.7992 | 45.2 |
| 13 | −34.85 | | | | f = 100 mm    β = −0.75674    λ = 546.070 nm    ω = 17.233°
$N_g$ = 1.50451    $N_f$ = 1.50123    $N_c$ = 1.49514

| Condition (1) | 80(θ₊ − 1) + $\nu_{d+}$ = | 44.5 |
|---|---|---|
| Conditions (2), (6) & (10) | $\nu_{d+}$ = | 81.5 |
| Condition (3) | $\nu_2 + \nu_5$ = | 163.1 |
| Conditions (4) & (11) | $\nu_+ − \nu_−$ = | 24.3 |
| Conditions (5) & (9) | $f_1 / f$ = | 0.5478 |
| Condition (7) | $|f_{25} / f|$ = | 0.3455 |
| Condition (8) | $\nu_3 + \nu_4$ = | 79.4 |
| Condition (12) | $f_{56} / f$ = | 0.2788 |
| Condition (13) | $D_{L3-L4} / f$ = | 0.2310 |
| Condition (14) | $D_{L4} / f$ = | 0.0146 |

As is apparent from Table 7, Conditions (1) to (14) are each satisfied in Embodiment 7. FIGS. 8A, 8B and 8C show the spherical aberration, astigmatism in the sagittal S and tangential T planes, and distortion, respectively, for each of the e, c, and g lines for this embodiment. The wavelength of the e line is 546.07 nm, the wavelength of the g line is 435.84 nm, and the wavelength of the c line is 656.27 nm. Axial chromatic aberration and coma are satisfactorily corrected. Therefore, high resolution image reading is realized.

Embodiment 8

Table 8 below lists the surface number #, in order from the object side, the radius of curvature R (in mm) of each surface, the on-axis spacing D (in mm) between the surfaces, as well as the refractive index $N_e$ (relative to the e line) and the Abbe number $\upsilon_d$ (relative to the d line) of each lens element of Embodiment 8. In the middle portion of the table are listed the focal length f, the magnification β, the reference wavelength λ, and the half-image angle ω, as well as the values of $N_g$, $N_f$, and $N_c$ for the second and fifth lens elements in order from the object side. In the bottom portion of the table are listed the value for each condition that is satisfied by the present embodiment.

TABLE 8

| # | R | D | $N_e$ | $\nu_d$ |
|---|---|---|---|---|
| 1 | 32.29 | 5.76 | 1.7923 | 47.4 |
| 2 | 115.52 | 0.65 | | |
| 3 | 41.97 | 5.16 | 1.4985 | 81.5 |
| 4 | ∞ | 0.00 | | |
| 5 | ∞ | 1.45 | 1.6580 | 39.7 |
| 6 | 24.30 | 12.32 | | |
| 7 | (stop) | 11.26 | | |
| 8 | −16.53 | 1.38 | 1.6580 | 39.7 |
| 9 | −99.21 | 0.00 | | |
| 10 | −99.21 | 6.46 | 1.4985 | 81.5 |
| 11 | −23.32 | 0.69 | | |
| 12 | −105.78 | 5.07 | 1.7992 | 45.2 |
| 13 | −35.31 | | | | f = 100 mm    β = −0.75674    λ = 546.070 nm    ω = 17.239°
$N_g$ = 1.50451    $N_f$ = 1.50123    $N_c$ = 1.49514

| Condition (1) | 80(θ₊ − 1) + $\nu_{d+}$ = | 44.5 |
|---|---|---|
| Conditions (2), (6) & (10) | $\nu_{d+}$ = | 81.5 |
| Condition (3) | $\nu_2 + \nu_5$ = | 163.1 |
| Conditions (4) & (11) | $\nu_+ − \nu_−$ = | 24.2 |
| Conditions (5) & (9) | $f_1 / f$ = | 0.5489 |
| Condition (7) | $|f_{25} / f|$ = | 0.3537 |
| Condition (8) | $\nu_3 + \nu_4$ = | 79.4 |
| Condition (12) | $f_{56} / f$ = | 0.2789 |
| Condition (13) | $D_{L3-L4} / f$ = | 0.2358 |
| Condition (14) | $D_{L4} / f$ = | 0.0138 |

As is apparent from Table 8, the conditions (1) to (14) are all satisfied in Embodiment 8. FIGS. 9A, 9B and 9C show the spherical aberration, astigmatism in the sagittal S and tangential T planes, and distortion, respectively, for each of the e, c, and g lines for this embodiment. The wavelength of the e line is 546.07 nm, the wavelength of the g line is 435.84 nm, and the wavelength of the c line is 656.27 nm. Axial chromatic aberration and coma are satisfactorily corrected. Therefore, high resolution image reading is realized.

Embodiment 9

Table 9 below lists the surface number #, in order from the object side, the radius of curvature R (in mm) of each surface, the on-axis spacing D (in mm) between the surfaces, as well as the refractive index $N_e$ (relative to the e line) and the Abbe number $\upsilon_d$ (relative to the d line) of each lens element of Embodiment 9. In the middle portion of the table are listed the focal length f, the magnification β, the reference wavelength λ, and the half-image angle ω, as well as the values of $N_g$, $N_f$, and $N_c$ for the second and fifth lens elements in order from the object side. In the bottom portion of the table are listed the value for each condition that is satisfied by the present embodiment.

TABLE 9

| # | R | D | $\nu_d$ | $\nu_d$ |
|---|---|---|---|---|
| 1 | 32.36 | 5.84 | 1.7608 | 47.8 |
| 2 | 106.81 | 1.06 | | |
| 3 | 33.45 | 4.54 | 1.4985 | 81.5 |
| 4 | 181.80 | 0.00 | | |
| 5 | 181.80 | 1.48 | 1.6580 | 39.7 |
| 6 | 22.22 | 12.84 | | |
| 7 | (stop) | 11.01 | | |
| 8 | −17.09 | 3.04 | 1.6580 | 39.7 |
| 9 | −206.61 | 0.00 | | |
| 10 | −206.61 | 6.18 | 1.4985 | 81.5 |
| 11 | −25.27 | 0.34 | | |
| 12 | −115.59 | 5.22 | 1.7992 | 45.3 |

TABLE 9-continued

| 13 | −35.43 | 0.69 | |
|---|---|---|---|
| f = 102 mm | β = −0.75668 | λ = 546.070 nm | ω = 17.180° |
| $N_g$ = 1.50451 | $N_f$ = 1.50123 | $N_c$ = 1.49514 | |
| Condition (1) | | $80(θ_+ − 1) + ν_{d+}$ = | 44.5 |
| Conditions (2), (6) & (10) | | $ν_{d+}$ = | 81.5 |
| Condition (3) | | $ν_2 + ν_5$ = | 163.1 |
| Conditions (4) & (11) | | $ν_+ − ν_−$ = | 24.4 |
| Conditions (5) & (9) | | $f_1 / f$ = | 0.5811 |
| Condition (7) | | $|f_{25} / f|$ = | 0.3610 |
| Condition (8) | | $ν_3 + ν_4$ = | 79.4 |
| Condition (13) | | $D_{L3-L4} / f$ = | 0.2348 |
| Condition (14) | | $D_{L4} / f$ = | 0.0299 |

As is apparent from Table 9, Conditions (1) to (11), (13) and (14) are each satisfied in Embodiment 9. FIGS. 10A, 10B and 10C show the spherical aberration, astigmatism in the sagittal S and tangential T planes, and distortion, respectively, for each of the e, c, and g lines for this embodiment. The wavelength of the e line is 546.07 nm, the wavelength of the g line is 435.84 nm, and the wavelength of the c line is 656.27 nm. Axial chromatic aberration and coma are satisfactorily corrected. Therefore, high resolution image reading is realized.

As is apparent from FIGS. 2(A)–10(C), the aberrations are satisfactorily corrected in each of the above embodiments.

As explained above, the lens system for reading images according to the invention enables distortion in red, green and blue light to be reduced on the CCD array(s) and for aberrations to be favorably corrected at a magnification of approximately 0.75. By employing a lens system formed of six lens elements which satisfy specified conditions, it is possible to realize high resolution so as to record high spatial frequencies of image. Furthermore, excellent images can be obtained using an image reader which employs the lens system for reading images according to the present invention.

The invention being thus described, it will be obvious that the same may be varied in many ways. For example the values of R and D may be appropriately scaled to achieve a lens of a desired focal length and resolution. Such variations are not to be regarded as a departure from the spirit and scope of the invention. Rather the scope of the invention shall be defined as set forth in the following claims and their legal equivalents. All such modifications as would be obvious to one skilled in the art are intended to be included within the scope of the following claims.

What is claimed is:

1. A lens system for reading images consisting of six lens elements, in order from the object side, as follows:
   a first lens element having positive refractive power and a convex surface on the object side;
   a second lens element having positive refractive power and a convex surface on the object side;
   a third lens element having negative refractive power and a concave surface on the image side;
   a fourth lens element having negative refractive power and a concave surface on the object side;
   a fifth lens element having positive refractive power and a convex surface on the image side; and,
   a sixth lens element having positive refractive power and a convex surface on the image side;
   wherein
   a stop is positioned between the third lens element and the fourth lens element;
   at least one pair of lens elements, of among (a) the second lens element and the third lens element and (b) the fourth lens element and the fifth lens element, are coupled together; and,
   the following conditions are satisfied:

$$80(θ_+−1)+ν_{d+}>44$$

$$ν_{d+}>60$$

where
   $θ_+$ is the partial dispersion ratio of the second lens element as well as of the fifth lens element, defined as $θ_+$ equals $(N_g−N_f)/(N_f−N_c)$, in which $N_g$, $N_f$, and $N_c$ are the index of refraction at the g, f, and c lines of the lens element, and
   $ν_{d+}$ is the Abbe number of the second lens element as well as of the fifth lens element.

2. The lens system of claim 1, wherein the following conditions are also satisfied:

$$160<ν_2+ν_5<170$$

$$23<ν_+−ν_−<28$$

where
   $ν_2$ is the Abbe number of the second lens element,
   $ν_5$ is the Abbe number of the fifth lens element,
   $ν_+$ is the mean of the Abbe numbers of the positive lens elements, and
   $ν_−$ is the mean of the Abbe numbers of the negative lens elements.

3. A lens system for reading images consisting of six lens elements, in order from the object side, as follows:
   a first lens element having positive refractive power and a convex surface on the object side;
   a second lens element having positive refractive power and a convex surface on the object side;
   a third lens element having negative refractive power and a concave surface on the image side;
   a fourth lens element having negative refractive power and a concave surface on the object side;
   a fifth lens element having positive refractive power and a convex surface on the image side; and,
   a sixth lens element having positive refractive power and a convex surface on the image side;
   wherein
   a stop is positioned between the third lens element and the fourth lens element;
   at least one pair of lens elements, of among (a) the second lens element and the third lens element and (b) the fourth lens element and the fifth lens element, are coupled together; and,
   the following conditions are satisfied:

$$f_1/f≦0.64$$

$$ν_{d+}<63$$

$$|f_{25}/f|≦0.4$$

where
   $f_1$ is the focal length of the first lens element,
   f is the focal length of the lens system,
   $ν_{d+}$ is the Abbe number of the second lens element as well as of the fifth lens element;
   $f_{25}$ is the composite focal length of the second through fifth lens elements.

4. The lens system for reading images according to claim 3, characterized in that the following condition is also satisfied:

$$76<ν_3+ν_4<82$$

where
- $\upsilon_3$ is the Abbe number of the third lens element, and
- $\upsilon_4$ is the Abbe number of the fourth lens element.

5. A lens system for reading images consisting of six lens elements, in order from the object side, as follows:
- a first lens element having positive refractive power and a convex surface on the object side;
- a second lens element having positive refractive power and a convex surface on the object side;
- a third lens element having negative refractive power and a concave surface on the image side;
- a fourth lens element having negative refractive power and a concave surface on the object side;
- a fifth lens element having positive refractive power and a convex surface on the image side; and,
- a sixth lens element having positive refractive power and a convex surface on the image side;

wherein
- a stop is positioned between the third lens element and the fourth lens element;
- at least one pair of lens elements, of among (a) the second lens element and the third lens element and (b) the fourth lens element and the fifth lens element, are coupled together; and,
- the following conditions are satisfied:

$$f_1/f \leq 0.60$$

$$\upsilon_{d+} > 63$$

$$23 < \upsilon_+ - \upsilon_- < 26$$

where
- f is the focal length of the lens system,
- $f_1$ is the focal length of the first lens element,
- $\upsilon_{d+}$ is the Abbe number of the second lens element as well as of the fifth lens element,
- $\upsilon_+$ is the mean of the Abbe numbers of the positive lens elements, and
- $\upsilon_-$ is the mean of the Abbe numbers of the negative lens elements.

6. The lens system of claim 1, in combination with an image reader that includes a CCD detector array.

7. The lens system of claim 2, in combination with an image reader that includes a CCD detector array.

8. The lens system of claim 3, in combination with an image reader that includes a CCD detector array.

9. The lens system of claim 4, in combination with an image reader that includes a CCD detector array.

10. The lens system of claim 5, in combination with an image reader that includes a CCD detector array.

11. The lens system of claim 1, wherein the following condition is also satisfied:

$$0.25 < f_{56}/f < 0.28$$

where
- $f_{56}$ is the composite focal length of the fifth lens element and the sixth lens element, and
- f is the focal length of the lens system.

12. The lens system of claim 1, wherein the following condition is also satisfied:

$$0.2 < D_{L3-L4}/f$$

where
- $D_{L3-L4}$ is the on-axis distance between the third lens element and the fourth lens element, and
- f is the focal length of the lens system.

13. The lens system of claim 1, wherein the following condition is also satisfied:

$$0.01 < D_{L4}/f$$

where
- $D_{L4}$ is the on-axis thickness of the fourth lens element, and
- f is the focal length of the lens system.

14. The lens system of claim 3, wherein the following condition is also satisfied:

$$0.25 < f_{56}/f < 0.28$$

where
- $f_{56}$ is the composite focal length of the fifth lens element and the sixth lens element, and
- f is the focal length of the lens system.

15. The lens system of claim 3, wherein the following condition is also satisfied:

$$0.2 < D_{L3-L4}/f$$

where
- $D_{L3-L4}$ is the on-axis distance between the third lens element and the fourth lens element, and
- f is the focal length of the lens system.

16. The lens system of claim 3, wherein the following conditions is also satisfied:

$$0.01 < D_{L4}/f$$

where
- $D_{L4}$ is the on-axis thickness of the fourth lens element, and
- f is the focal length of the lens system.

17. The lens system of claim 5, wherein the following condition is also satisfied:

$$0.25 < f_{56}/f < 0.28$$

where
- $f_{56}$ is the composite focal length of the fifth lens element and the sixth lens element, and
- f is the focal length of the lens system.

18. The lens system of claim 5, wherein the following condition is also satisfied:

$$0.2 < D_{L3-L4}/f$$

where
- $D_{L3-L4}$ is the on-axis distance between the third lens element and the fourth lens element, and
- f is the focal length of the lens system.

19. The lens system of claim 5, wherein the following conditions is also satisfied:

$$0.01 < D_{L4}/f$$

where
- $D_{L4}$ is the on-axis thickness of the fourth lens element, and
- f is the focal length of the lens system.

* * * * *

UNITED STATES PATENT AND TRADEMARK OFFICE
CERTIFICATE OF CORRECTION

PATENT NO. : 6,366,412 B1
DATED : April 2, 2002
INVENTOR(S) : Noda et al.

It is certified that error appears in the above-identified patent and that said Letters Patent is hereby corrected as shown below:

Column 6,
Line 20, change "$f_6/f$" to -- $f_{56}/f$ --;
Line 50, change "TABLE" to -- TABLE 1 --;

Column 7,
Line 1, change "TABLE-continued" to -- TABLE 1-continued --;

Column 11,
Table 7, change "Condition (7)    $|f_{25}/f =$" to
-- Condition (7)    $|f_{25}/f| =$ --;

Column 13,
Table 9, change "Condition (7)    $|f_{25}/f =$" to
-- Condition (7)    $|f_{25}/f| =$ --; and Column 14,
Line 54, change "$\upsilon_{d+} < 63$" to -- $\upsilon_{d+} > 63$ --.

Signed and Sealed this

Third Day of September, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO.   : 6,366,412 B1
DATED        : April 2, 2002
INVENTOR(S)  : Noda et al.

It is certified that error appears in the above-identified patent and that said Letters Patent is hereby corrected as shown below:

Title page,
Item [*], Notice, delete the phrase "by 0 days" and insert -- by 57 days --

Signed and Sealed this

Twenty-first Day of September, 2004

JON W. DUDAS
*Director of the United States Patent and Trademark Office*